United States Patent
Fujita et al.

(10) Patent No.: US 7,862,768 B2
(45) Date of Patent: Jan. 4, 2011

(54) PLAIN BEARING AND METHOD OF MANUFACTURING THE SAME

(75) Inventors: Masahito Fujita, Inuyama (JP); Eisaku Inoue, Inuyama (JP); Shigeru Inami, Inuyama (JP)

(73) Assignee: Daido Metal Company Ltd, Nagoya (JP)

( * ) Notice: Subject to any disclaimer, the term of this patent is extended or adjusted under 35 U.S.C. 154(b) by 0 days.

(21) Appl. No.: 12/110,003

(22) Filed: Apr. 25, 2008

(65) Prior Publication Data

US 2008/0206087 A1 Aug. 28, 2008

Related U.S. Application Data

(62) Division of application No. 11/094,352, filed on Mar. 31, 2005, now abandoned.

(30) Foreign Application Priority Data

Mar. 31, 2004 (JP) ............................. 2004-107053

(51) Int. Cl.
B22F 7/00 (2006.01)
B05D 1/02 (2006.01)
B05D 1/08 (2006.01)
B05D 1/12 (2006.01)
B05D 3/00 (2006.01)
C23C 4/04 (2006.01)
C23C 4/08 (2006.01)
C22F 1/00 (2006.01)

(52) U.S. Cl. .................. 419/8; 427/421.1; 427/446; 427/452; 427/455; 427/456; 427/422; 427/180; 427/190; 427/192; 148/512

(58) Field of Classification Search ................. 148/512; 419/8; 427/421.1, 446, 452, 455, 456, 422, 427/180, 190, 192
See application file for complete search history.

(56) References Cited

U.S. PATENT DOCUMENTS

| | | | |
|---|---|---|---|
| 4,725,512 A | 2/1988 | Scruggs | |
| 5,362,574 A | 11/1994 | Tanaka et al. | |
| 5,384,205 A | 1/1995 | Tanaka et al. | |
| 5,432,013 A | 7/1995 | Tanaka et al. | |
| 6,090,497 A * | 7/2000 | Mori et al. | 428/641 |
| 6,439,451 B1 | 8/2002 | Kagohara et al. | |

(Continued)

FOREIGN PATENT DOCUMENTS

JP 59221479 A 12/1984

(Continued)

OTHER PUBLICATIONS

Berndt et al., Thermal Spray Processes, ASM Handbook, 2003, ASM International, vol. 13A, p. 803-813.*

*Primary Examiner*—Roy King
*Assistant Examiner*—Caitlin Fogarty
(74) *Attorney, Agent, or Firm*—Browdy & Neimark, PLLC

(57) ABSTRACT

A plain bearing is provided which has an Sn-and-Si-rich layer formed of an Al alloy containing Sn and Si, and a base material which does not contain Sn. The Sn-and-Si-rich layer have the sliding surface having an area ratio of Sn phase grains in a range of 6 to 40% and that of Si phase grains in a range of 5 to 25%.

6 Claims, 1 Drawing Sheet

U.S. PATENT DOCUMENTS 6,471,796 B1 10/2002 Kagohara et al.
6,800,377 B2 10/2004 Takayanagi et al.

FOREIGN PATENT DOCUMENTS

| JP | 61-3888 | 9/1986 |
| JP | 05-322364 | 12/1993 |
| JP | 10-152742 | 6/1998 |
| JP | 2002-038230 | 2/2002 |
| JP | 2002-206158 | 7/2002 |
| JP | 2003-277948 | 10/2003 |
| JP | 2004-028242 | 1/2004 |

* cited by examiner

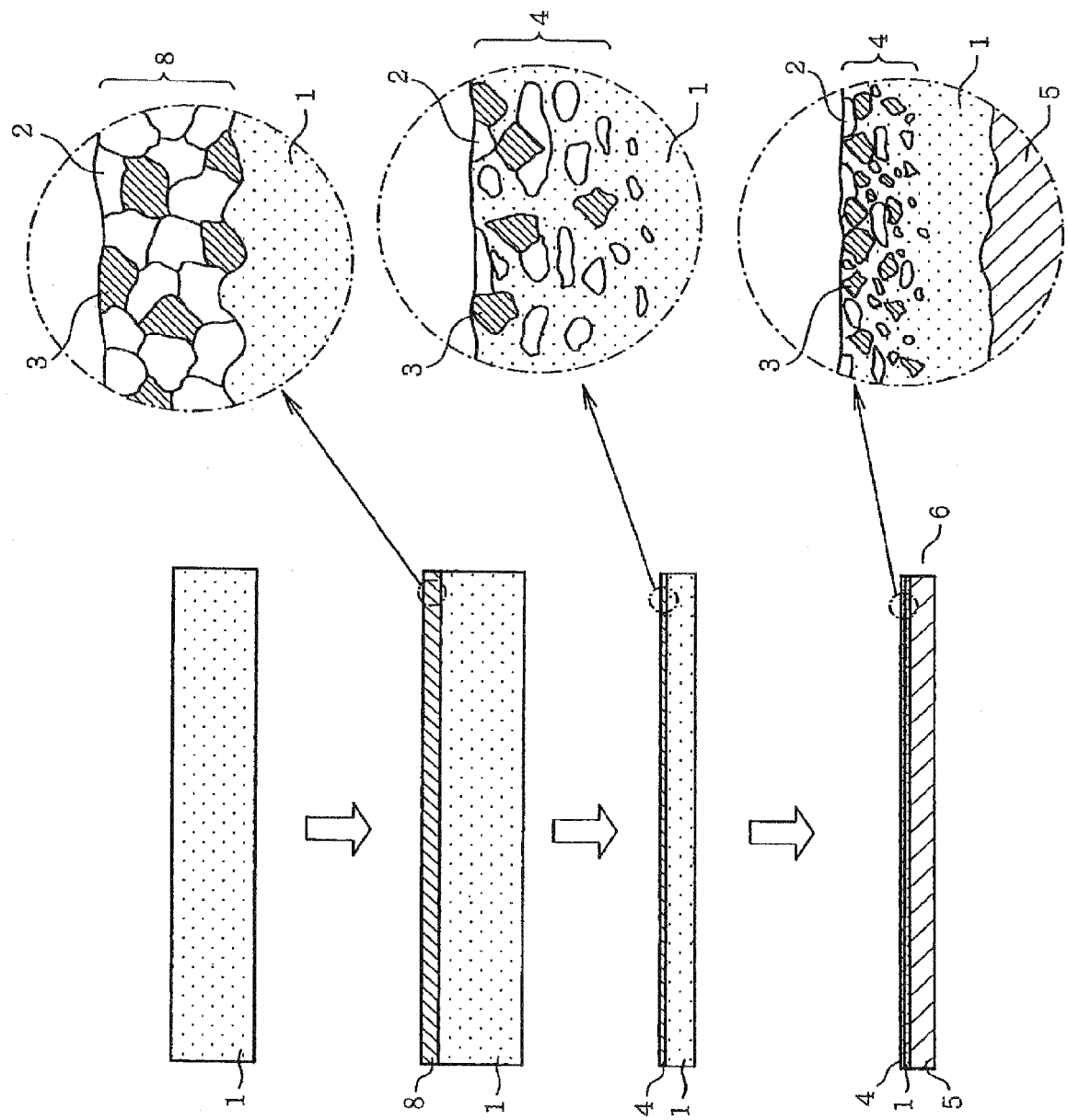

PLAIN BEARING AND METHOD OF MANUFACTURING THE SAME

The present invention is a divisional application of U.S. Ser. No. 11/094,352 filed on Mar. 31, 2005, now abandoned.

BACKGROUND OF THE INVENTION

1. Field of the Invention

The present invention relates to a plain bearing comprising an aluminum (Al) alloy, and a method of manufacturing the same.

2. Description of the Related Art

A plain bearing comprising an Al alloy has been usually manufactured through the following steps. That is, the steps include casting the Al alloy, then annealing it, facing it, cladding it with pure Al plate, rolling the clad Al plate, and finally cladding the rolled plate with a steel plate constituting a back metal. In this case, the Al alloy contains comparatively soft tin (Sn) or comparatively hard silicon (Si) in order to improve a bearing properties.

However, the above manufacturing method has the following problems. First, the Al alloy contains Si as hard particles. In order to roll the Al alloy plate as described above, an amount of Si contained in the Al alloy has to be 4 mass % at maximum. This is because ductility of the Al alloy is reduced, and the Al alloy may break in rolling, if the Al alloy contains a large amount of Si. Therefore, the amount of Si cannot be increased.

Moreover, because the Al alloy contains a large amount of Sn, the Al alloy cannot be directly clad to a steel. It is because a sufficient bonding to steel cannot be obtained due to Sn. Therefore, in order to bond the Al alloy to the steel, it is necessary to dispose an intermediate layer of pure Al, because the pure Al does not contain Sn and has ductility. However cost increases unavoidably by adding this step.

It is to be noted that JP-A-59-221479 discloses a swash plate rotated on an axis in a swash plate type compressor for use in an air conditioning system of a vehicle. The swash plate is manufactured as follows. Si powder is linearly applied to the sliding surface of a base material formed of an Al alloy (A390), and then laser beam is irradiated on the Si powder. The Si powder and the base material around the powder are molten, and thereafter solidified to form a hardened layer having a high Si content, on the surface of the base material.

In the plain bearing comprising the Al alloy, there has been a demand for further improvement of resistance to wear and seizure in recent years, but a plain bearing having the above conventional constitution can not satisfy the demand.

SUMMARY OF THE INVENTION

The present invention has been developed in order to solve the above problem. An objective thereof is to provide a plain bearing including an Al alloy as a base material, which satisfies conformability and resistance to seizure and wear, and a method of manufacturing the plain bearing.

In order to achieve the objective, there is provided a plain bearing comprising: a base material formed of an Al alloy which does not contain Sn; and an Sn-and-Si-rich layer formed of an Al alloy containing Sn and Si, the Sn-and-Si-rich layer being adjacent to the base material and having a sliding surface, wherein the sliding surface has an area ratio of Sn phase to the sliding surface being in a range of 6 to 40%, and an area ratio of Si phase to the sliding surface being in a range of 5 to 25%.

Here, Sn is a comparatively soft metal, and serves for improving conformability and anti-seizure properties. Moreover, Si is a comparatively hard metal, and serves for improving wear resistance. In the above constitution, the plain bearing has the Sn-and-Si-rich layer formed of the Al alloy on the side toward the sliding surface, on the surface of the base material formed of the Al alloy. The Sn-and-Si-rich layer has the sliding surface in which an area ratios occupied by Sn and Si phase are in the above ranges. Consequently, it is possible to satisfy the conformability, and resistance to seizure and wear.

Furthermore, because the base material formed of the Al alloy does not contain Sn, a sufficient bonding between the base material and a steel can be obtained. Therefore, unlike the conventional method, it is unnecessary to dispose an intermediate layer of pure Al which does not contain Sn, and the base material can be directly clad to a steel constituting a back metal.

The ranges of the area ratios of Sn phase and Si phase in the surface of the Sn-and-Si-rich layer are limited for the following reasons. When the area ratio of Sn phase is less than 6%, the anti-seizure property is deteriorated. When the ratio exceeds 40%, a matrix strength decreases, and anti-fatigue property is deteriorated. When the area ratio of Si phase is less than 5%, the material loses wear resistance. When the ratio of Si phase exceeds 25%, the material becomes brittle, and rolling crack occurs when worked.

The base material contains 0.1 to 1.5 mass % of Si, 0.2 to 5.0 mass % of Cu, and a total amount of 0.01 to 7.0 mass % of one or more selected from a group consisting of Mn, Cr, Mg, Zn, Ti, Zr, V and B.

Above each element is added for strengthening an Al matrix. When 0.1 mass % or more of silicon (Si) is contained, the strengthening effect is enhanced, while Si is preferably at levels not more than 1.5 mass % to make the material ductile. Moreover, copper (Cu) is a most effective element for strengthening the Al matrix. When Cu is at levels 0.2 mass % or more, the strengthening effect is enhanced. When Cu is at levels 5 mass % or less, formation of an Al—Cu compound is suppressed, and so the matrix is effectively prevented from being brittle. Moreover, Cu is more preferably in a range of 0.3 to 4.0 mass %. A total amount of 0.01 to 7.0 mass % of one or more selected from a group consisting of Mn, Cr, Mg, Zn, Ti, Zr, V and B is effective for strengthening the Al matrix, because those elements solid-solute or precipitate in the matrix.

As a method of manufacturing the above plain bearing, it is possible to adopt a method comprising steps of: providing a base material formed of an Al alloy which does not contain Sn; bombarding the surface of the base material with powder of Sn and/or powder of an Al—Sn alloy and powder of Si and/or powder of an Al—Si alloy, by a so-called cold spraying process, so as to form a layer containing Sn and Si; and rolling and annealing to form a Sn-and-Si-rich layer in which Sn phase and Si phase are crystallized and distributed in an Al alloy matrix.

According to the above manufacturing method, the Sn-and-Si-rich layer for improving a bearing property can be satisfactorily formed adjacent to the base material which does not contain Sn. Levels of Sn and Si can be controlled by the supplied powder. Therefore, it is also possible to increase the amount of Si. By the step of distributing the crystallized Sn phase and Si phase in the base material, that is, by adapting the Sn and Si phase to the base material, fatigue resistance can be improved.

Furthermore, as another manufacturing method, it is possible to adopt a method comprising steps of: providing a base material formed of an Al alloy which does not contain Sn; scattering powder of Sn and/or powder of an Al—Sn alloy and powder of Si and/or powder of an Al—Si alloy on the surface of the base material, by a so-called laser cladding process; melting and alloying the powders by laser beam so as to form a layer containing Sn and Si; and rolling and annealing to form a Sn-and-Si-rich layer in which Sn phase and Si phase are crystallized and distributed in an Al alloy matrix.

In the above manufacturing method, the Sn-and-Si-rich layer containing Sn and Si for improving a bearing property can be satisfactorily formed adjacent to the base material which does not contain Sn. Sn and Si levels can be controlled by the supplied powder. By the step of distributing the crystallized Sn phase and Si phase, that is, by adapting the Sn and Si phase to the base material, anti-fatigue property can be improved.

According to the plain bearing of the present invention, a plain bearing including an Al alloy is provided, which satisfies conformability, and resistance to seizure and wear. A plain bearing is also provided which is superior in fatigue resistance.

According to the manufacturing method of the present invention, the plain bearing of the present invention are satisfactorily manufactured.

BRIEF DESCRIPTION OF THE DRAWINGS

FIGS. 1A to 1D are sectional views showing manufacturing steps according to an embodiment of the present invention, and partially enlarged sectional views schematically showing the manufacturing steps.

DESCRIPTION OF THE PREFERRED EMBODIMENT

An embodiment of the present invention is described hereinafter with reference to Tables 1 to 5 and FIGS. 1A to 1D.

TABLE 2

|  | Sample No. No | Area % occupying sliding surface | | Wear loss μm | Seizure load MPa | Fatigue load MPa |
|---|---|---|---|---|---|---|
|  |  | Si phase area ratio % | Sn phase area ratio % |  |  |  |
| Example 1 of present invention (laser cladding process) | 1 | 7 | 6 | 5 | 70 | 80 |
|  | 2 | 10 | 8 | 4 | 75 | 85 |
|  | 3 | 8 | 10 | 5 | 65 | 100 |
|  | 4 | 15 | 15 | 3 | 70 | 110 |
|  | 5 | 20 | 20 | 2 | 80 | 120 |
|  | 6 | 10 | 25 | 3 | 75 | 110 |
|  | 7 | 6 | 30 | 5 | 100 | 100 |
|  | 8 | 15 | 10 | 3 | 75 | 120 |
|  | 9 | 20 | 12 | 2 | 75 | 110 |
|  | 10 | 25 | 12 | 1 | 70 | 95 |
|  | 11 | 20 | 7 | 1 | 80 | 90 |
| Example 2 of present invention (cold spraying process) | 1 | 7 | 6 | 7 | 75 | 90 |
|  | 2 | 10 | 8 | 5 | 60 | 85 |
|  | 3 | 8 | 10 | 6 | 75 | 100 |
|  | 4 | 15 | 15 | 4 | 80 | 110 |
|  | 5 | 20 | 20 | 3 | 90 | 110 |
|  | 6 | 10 | 25 | 2 | 75 | 100 |
|  | 7 | 6 | 30 | 7 | 95 | 100 |
|  | 8 | 15 | 10 | 3 | 80 | 120 |
|  | 9 | 20 | 12 | 3 | 75 | 110 |
|  | 10 | 25 | 12 | 2 | 80 | 100 |
|  | 11 | 20 | 7 | 2 | 75 | 90 |
| Comparative example | 12 | 2.5 | 5 | 10 | 40 | 70 |
|  | 13 | 3 | 4 | 12 | 45 | 65 |
|  | 14 | 3 | 5 | 15 | 55 | 70 |
|  | 15 | 0 | 8 | 30 | 60 | 50 |

TABLE 3

| Wear test conditions | | |
|---|---|---|
| Tester | Unit | Wear tester |
| Speed of rotation | rpm | 1000 |
| Peripheral speed | m/sec | 1 |
| Test load | MPa | 10 |
| Test time | Hrs | 10 |
|  |  | Start 60 sec. Stop 30 sec. |
| Oil quantity | ml/min | 2 |
| Lubricant oil |  | VG22 |

TABLE 1

|  | No | Base material | | | | | | | | | | | | Supplied powder | | |
|---|---|---|---|---|---|---|---|---|---|---|---|---|---|---|---|---|
|  |  | Al | Sn | Si | Cu | Mn | Mg | Cr | Zn | V | Ti | Zr | B | Si | Al—40Si | Sn |
| Present invention | 1 | Balance |  |  | 0.2 | 1 |  |  |  |  |  |  | 0.02 | 50 |  | 50 |
|  | 2 | Balance |  |  | 4 | 0.7 | 1.5 |  |  | 0.1 |  |  | 0.05 |  | 50 | 50 |
|  | 3 | Balance |  | 1 | 4 | 1 | 0.6 |  |  | 0.1 |  |  | 0.05 |  | 70 | 30 |
|  | 4 | Balance |  |  |  |  | 2.5 | 0.2 |  |  |  |  |  | 50 |  | 50 |
|  | 5 | Balance |  | 0.5 |  |  | 0.7 |  |  |  |  |  |  |  | 80 | 20 |
|  | 6 | Balance |  |  |  |  | 0.7 |  | 6 |  |  | 0.2 | 0.05 |  | 50 | 50 |
|  | 7 | Balance |  | 1.7 |  |  | 2.5 | 0.2 | 5.5 |  | 0.1 | 0.1 | 0.03 | 40 |  | 60 |
|  | 8 | Balance |  | 1 | 0.2 |  |  |  |  | 0.2 | 0.1 |  | 0.02 | 70 |  | 30 |
|  | 9 | Balance |  | 0.7 | 1.5 | 0.1 |  |  |  |  | 0.2 | 0.15 | 0.05 | 70 |  | 30 |
|  | 10 | Balance |  | 0.5 | 1.2 |  |  |  |  | 4.5 |  |  | 0.02 |  | 70 | 30 |
|  | 11 | Balance |  | 0.7 | 1 |  |  |  | 0.2 |  |  | 0.05 |  |  | 60 | 40 |
| Comparative example | 12 | Balance | 12 | 2.7 | 1.5 | 0.2 |  |  |  | 0.2 | 0.1 |  | 0.03 |  |  |  |
|  | 13 | Balance | 10 | 3 | 1 | 0.2 | 0.3 |  |  |  |  | 0.2 |  |  |  |  |
|  | 14 | Balance | 13 | 3 | 0.7 | 0.15 |  |  |  | 0.1 |  |  | 0.02 |  |  |  |
|  | 15 | Balance | 20 |  | 1 |  |  |  |  |  |  |  |  |  |  |  |

TABLE 3-continued

Wear test conditions

| Tester | Unit | Wear tester |
|---|---|---|
| Shaft material | | S55C |
| Evaluation method | | Wear loss measurement |

TABLE 4

Seizure test conditions

| Tester | Unit | Seizure tester |
|---|---|---|
| Speed of rotation | rpm | 7200 |
| Peripheral speed | m/sec | 20 |
| Test load | MPa | Increase every 10 MPa every 10 minutes |
| Oil temperature | °C. | 100 |
| Oil quantity | ml/min | 150 |
| Lubricant oil | | VG22 |
| Shaft material | | S55C |
| Evaluation method | | Judge seizure load, when bearing rear-surface temperature exceeds 200° C. or shaft driving belt slips by torque fluctuation |

TABLE 5

Fatigue test conditions

| Tester | Unit | Fatigue tester |
|---|---|---|
| Speed of rotation | rpm | 3250 |
| Peripheral speed | m/sec | 9 |
| Test load | MPa | Maximum load |
| Test time | Hrs | 20 |
| Oil temperature | °C. | 100 |
| Oil pressure | MPa | 0.49 |
| Lubricant oil | | VG68 |
| Shaft material | | S55C |
| Evaluation method | | Maximum load that does not cause fatigue |

Example 1

First, a manufacturing method of Example 1 of the present invention will be described. In a method of Example 1, a Sn-and-Si-rich layer was formed through a laser cladding process.

Al alloys of the present invention shown in Table 1, which did not contain Sn, were cast. Thereafter, rolling and annealing were repeated, and plate materials (see FIG. 1A) having a thickness of 8.0 mm were prepared. Each plate material was used as a base material 1 formed of the Al alloy which does not contain Sn. Compositions of the Al alloys are shown in Table 1 (see Nos. 1 to 11 of the present invention). Each cast aluminum alloy does not contain Sn.

Powder of Si or an Al-40Si alloy, and powder of Sn were used as a supplied powder, and they were mixed at each mass ratio shown in Table 1. The mixed powder was spread on the upper surface of the base material 1. Laser beam was irradiated on the upper surface of the base material 1, so that the spread powder and an Al alloy in close vicinity to the powder were molten and alloyed. Accordingly, as shown in FIG. 1B, a layer 8 containing Sn and Si which contains more Sn 2 and Si 3 than the inside of the base material 1 was formed on the upper surface of the base material 1. A particle size of each used powder was not more than 150 μm. It is to be noted that FIG. 1B is a schematic diagram showing Nos. 1, 4, 7, 8 and 9 of the present invention, in which the supplied powder does not contain Al.

Rolling and annealing were repeated again, and a plate material having the Sn-and-Si-rich layer 4 on the surface thereof and having a thickness of 1.0 mm was obtained as shown in FIG. 1C. Consequently, the Sn phase 2 and Si phase 3 in the layer 8 containing Sn and Si were adapted to the base material 1.

The plate material was roll-bonded to a steel (mild steel strip) plate 5 to form a bimetal 6. Thereby, the surface (lower surface of FIG. 1C) of the plate material which did not contain Sn was bonded to the steel (see FIG. 1D). Accordingly, the bimetal 6 having the Sn-and-Si-rich layer 4 formed of the Al alloy on the side toward the sliding surface, on the base material 1 formed of the Al alloy. The Sn-and-Si-rich layer has area ratios of the Sn phase 2 and Si phase 3 as shown in Table 2. Thereafter, this bimetal 6 was worked into a halved bearing shape, which was used as a test piece.

Using samples prepared by the above steps, the surfaces of the Sn-and-Si-rich layers 4, constituting the sliding surfaces, were analyzed by an image analysis device. Area ratios of Sn phase and Si phase in the surfaces were measured. Wear test, seizure test, and fatigue test were also carried out to evaluate bearing performances with the above test pieces. Results are shown in Table 2 (see sample Nos. 1 to 11 of Example 1 (laser cladding process) of the present invention). Conditions of the wear test, seizure test and fatigue test are shown in Tables 3, 4 and 5.

Example 2

Next, a manufacturing method of Example 2 will be described. In this method, the Sn-and-Si-rich layer was formed using a cold spraying process.

In the same manner as in Example 1, Al alloys of the present invention shown in Table 1, which did not contain Sn, were cast. Thereafter rolling and annealing were repeated, and plate materials (see FIG. 1A) having a thickness of 8.0 mm were prepared. Each plate material was used as a base material 1 formed of the Al alloy which does not contain Sn. Compositions of the Al alloys are shown in Table 1 (see Nos. 1 to 11 of the present invention). Each cast aluminum alloy does not contain Sn.

Powder of Si or an Al-40Si alloy, and powder of Sn were used as a supplied powder, and they were mixed at each mass ratio shown in Table 1. The mixed powder was struck onto the surface of the base material 1 by the cold spraying process, and a layer 8 containing Sn and Si which contains more Sn 2 and Si 3 than the inside of the base material 1 was formed (see FIG. 1B). A particle size of each used powder was not more than 150 μm. Thereafter, in this example, the materials were heat treated at a temperature of not less than an Al—Si eutectic point (577° C.), so that the Sn-and-Si-rich layer 4 and an Al alloy in close vicinity to the layer in the base material 1 were alloyed.

The cold spraying process is one of flame spraying. In this process, a gas is heated at temperature lower than a melting point or a softening temperature of the material (supplied powder), and is passed in a de Laval Nozzle to form a supersonic flow. A supplied powder which is a raw material of a film is charged into the flow and is accelerated. The powder in a solid phase state is bombarded on a surface of a substrate (base material) at a high speed to thereby form a film. This cold spraying process has an advantage that a thick, dense and adhesive film can be formed with high spray efficiency, without substantial oxidation or thermal change of properties.

In the same manner as in Example 1, rolling and annealing were repeated, and a plate material having the Sn-and-Si-rich layer 4 on the surface thereof and having a thickness of 1.0 mm was obtained (see FIG. 1C). Consequently, the Sn phase 2 and Si phase 3 in the layer 8 containing Sn and Si is adapted to the base material 1.

A bimetal 6 was produced by the same step as that of Example 1, and the bimetal 6 was worked into a halved bearing shape, which was used as a test piece.

Using samples prepared by the above steps, the surfaces of the Sn-and-Si-rich layers 4, constituting the sliding surfaces, were analyzed by the image analysis device in the same manner as in Example 1, and the area ratios of Sn phase and Si phase in the surfaces were measured. Wear test, seizure test, and fatigue test were carried out to evaluate bearing performances with the above test pieces. Results are shown in Table 2 (see sample Nos. 1 to 11 of Example 2 (cold spraying process) of the present invention). Conditions of the wear test, seizure test and fatigue test are same as those of Example 1.

Comparative Example

A manufacturing method of a comparative example will be described. This comparative example is manufactured through a conventional method.

First, Al alloys of the comparative examples shown in Table. 1 were cast. Thereafter, rolling and annealing were repeated, and plate materials having a predetermined thickness were prepared. Compositions of the Al alloys are shown in Table 1 (see Nos. 12 to 15 in the comparative example). In this case, all the cast Al alloys contain Sn.

After facing the plate material, it was clad to pure Al plate which did not contain Sn. Rolling and annealing were repeated, and a plate material having a predetermined thickness was obtained. The clad plate was roll-bonded to a steel, with the pure Al surface being bonded to the steel. Thereby a bimetal was formed. Thereafter, the bimetal was worked into a halved bearing shape, which was used as a test piece.

Using samples prepared by the above steps, the sliding surfaces of samples were analyzed by the image analysis device, and area ratios of Sn phase and Si phase were measured. Wear test, seizure test, and fatigue test were carried out to evaluate bearing properties with the above test pieces. Results are shown in Table 2 (see sample Nos. 12 to 15 of the comparative example). Conditions of the wear test, seizure test and fatigue test are same as those of Example 1.

Table 2 shows the area ratios of Sn phase and Si phase to the bearing surface. All of the sample Nos. 1 to 11 in Example 1 of the present invention and the sample Nos. 1 to 11 in Example 2 of the present invention have the area ratio of Sn phase in a range of 6 to 40%, and that of Si phase in a range of 5 to 20%.

The bearing properties of Examples 1 and 2 of the present invention were compared with those of the comparative example. A wear loss of the comparative example was not less than 10 μm, while those of Examples 1 and 2 of the present invention were not more than 7 μm. It has been found that Examples 1 and 2 of the present invention are superior in wear resistance. A seizure load of the comparative example was not more than 60 MPa, while the loads of Examples 1 and 2 of the present invention were not less than 60 MPa. It has been found that Examples 1 and 2 of the present invention are superior in anti-seizure property. A fatigue load of the comparative example was not more than 70 MPa, while the loads of Examples 1 and 2 of the present invention were not less than 80 MPa. It has been found that Examples 1 and 2 of the present invention are superior in fatigue resistance.

From the above, it is seen that Examples 1 and 2 of the present invention are superior in the resistance to wear, seizure and fatigue. The Examples 1 and 2 of the present invention also have good conformability.

Moreover, because the matrix alloys of the base material 1 in Examples 1 and 2 do not contain Sn, it is bonded strongly to the steel 5. Therefore, unlike the conventional technique, it is unnecessary to dispose an intermediate layer of pure Al which does not contain Sn, and the base material can be directly clad to the steel 5 constituting a back metal. Consequently, manufacturing costs can be reduced.

The invention claimed is:

1. A method for manufacturing a plain bearing,
   a. wherein:
      said plain bearing comprises
         (1) a base material formed of an aluminum alloy that does not contain tin; and
         (2) a tin-and-silicon rich layer formed of an aluminum alloy consisting essentially of aluminum, tin and silicon, the tin-and-silicon-rich layer being adjacent to the base material and having a sliding surface;
      wherein the sliding surface has an area ratio of tin phase in a range of 6 to 40%, and an area range of silicon phase in a range of 15 to 25%;
   b. the method comprising:
      i. providing a base material formed of an aluminum alloy that does not contain tin;
      ii. bombarding the surface of the base material with a powder of at least one of (a) solid particles of tin and (b) powder of solid particles of an aluminum-tin alloy, and at least one of (c) silicon powder of solid particles or (d) powder of solid particles of an aluminum-silicon alloy, so as to form a layer containing tin and silicon; and
      iii. rolling and annealing to form the tin-and-silicon rich layer in which the tin phase and the silicon phase are crystallized and distributed in an aluminum alloy matrix.

2. The method according to claim 1 wherein the base material contains 0.1 to 1.5 mass % of silicon, 0.2 to 5.0 mass % of copper, and a total amount of 0.01 to 7.0 mass % of one or more elements selected from the group consisting of manganese, chromium, magnesium, zinc, titanium, zirconium, vanadium and boron.

3. The method of claim 1 wherein the surface adjacent to the base material has a lower area ratio of Sn phase than that of the sliding surface.

4. A method for manufacturing a plain bearing,
   a. wherein:
      i. said plain bearing comprises a base material formed of an aluminum alloy that does not contain tin; and
      ii. a tin-and-silicon rich layer formed of an aluminum alloy consisting essentially of aluminum, tin and silicon, the tin-and-silicon-rich layer being adjacent to the base material and having a sliding surface;
      iii. wherein the sliding surface has an area ratio of tin phase in a range of 6 to 40%, and an area range of silicon phase in a range of 15 to 25%;
   b. the method comprising:
      i. providing a base material formed of an aluminum alloy that does not contain tin;
      ii. scattering at least one of (a) a powder of solid particles of tin and (b) a powder of solid particles of an aluminum-tin alloy, and scattering at least one of (c) a powder of solid particles of silicon and (d) a powder of solid particles of an aluminum-silicon alloy onto a surface of the base material formed of an aluminum alloy that does not contain tin;

iii. melting and alloying the powders by laser beam so as to form a layer containing tin and silicon; and iv. rolling and annealing to form a tin-and-silicon-rich layer in which the tin phase and the silicon phase are crystallized and distributed in an aluminum alloy matrix.

5. The method according to claim 4 wherein the base material contains 0.1 to 1.5 mass % of silicon, 0.2 to 5.0 mass % of copper, and a total amount of 0.01 to 7.0 mass % of one or more elements selected from the group consisting of manganese, chromium, magnesium, zinc, titanium, zirconium, vanadium and boron.

6. The method of claim 4 wherein the surface adjacent to the base material has a lower area ratio of Sn phase than that of the sliding surface.

* * * * *